Sept. 27, 1955 A. L. BREWER 2,719,216
ANTIGLARE HEADLIGHT ATTACHMENT FOR VEHICLES
Filed March 30, 1953 2 Sheets-Sheet 1
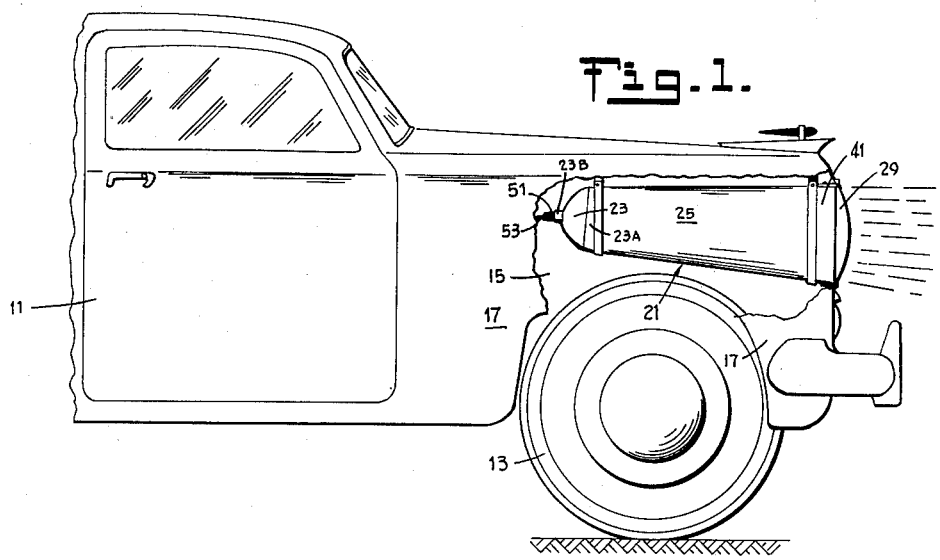
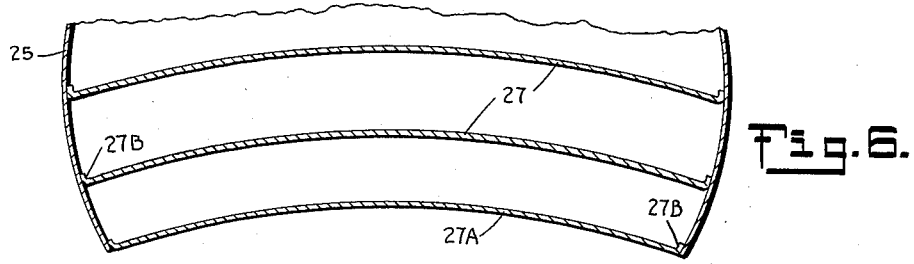
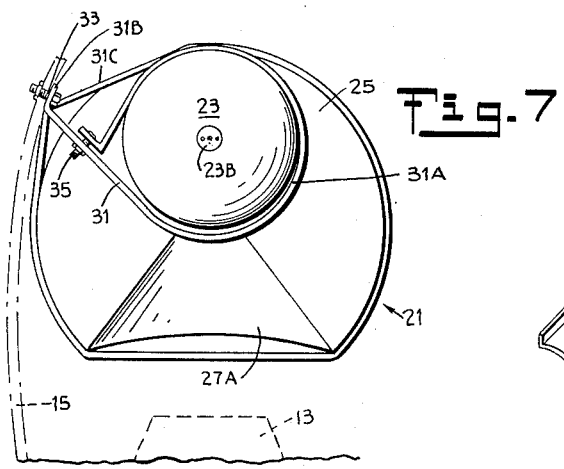
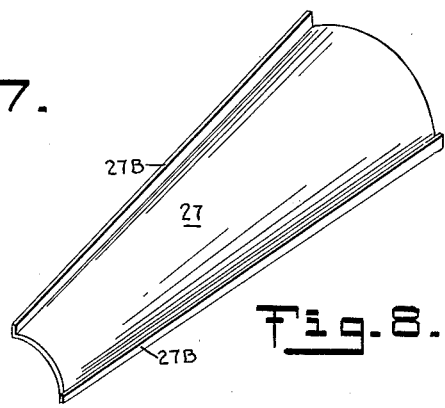
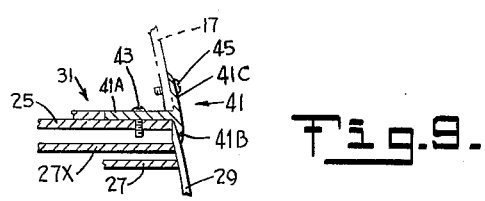
INVENTOR
ASA L. BREWER
BY
Weatherford and Weatherford
attys

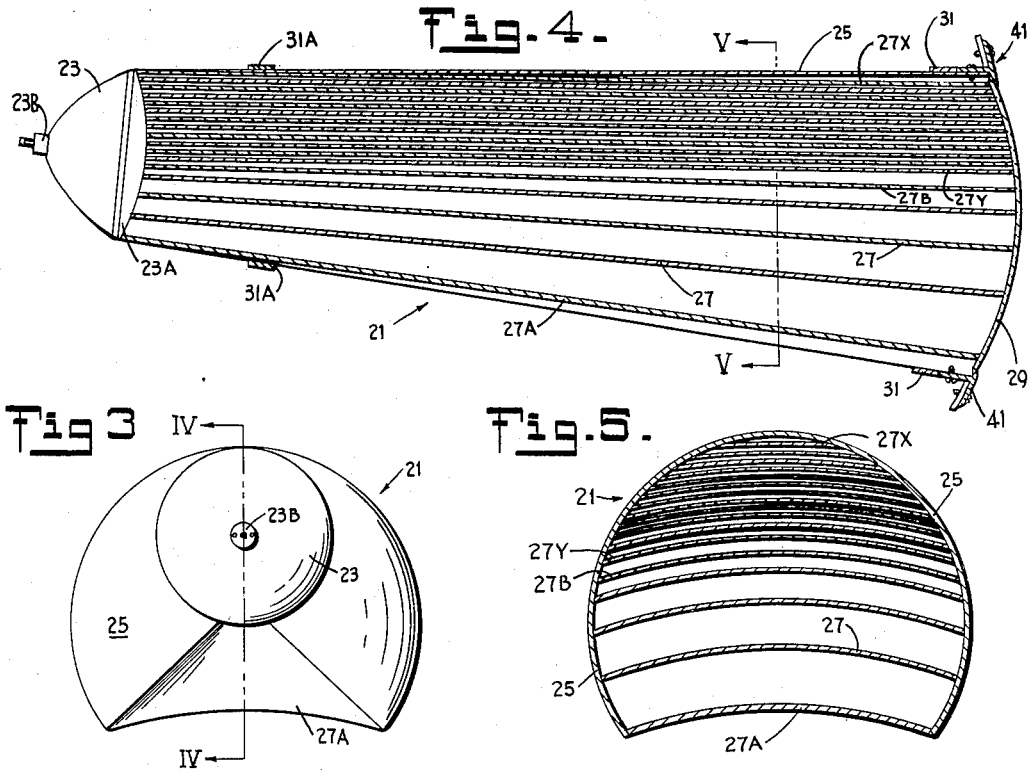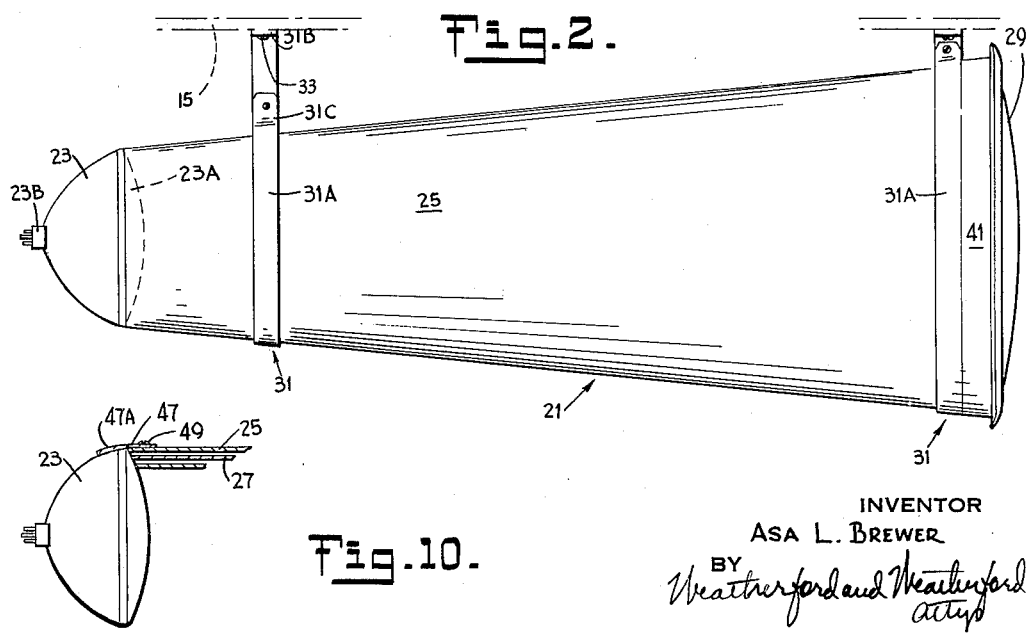

United States Patent Office 2,719,216
Patented Sept. 27, 1955

2,719,216

ANTIGLARE HEADLIGHT ATTACHMENT FOR VEHICLES

Asa L. Brewer, Natchez, Miss.

Application March 30, 1953, Serial No. 345,470

4 Claims. (Cl. 240—46.31)

This invention relates to an anti-glare headlight attachment for automobiles.

More particularly the invention relates to an anti-glare headlight attachment comprising a series of vertically spaced, approximately horizontally disposed light-deflecting plates. Specifically the invention comprises an anti-glare headlight attachment formed of transverse arcuately curved, vertically spaced light-deflecting vanes having concave polished under surfaces and convex dull upper surfaces, said vanes being enclosed by a substantially conical housing closed at its forward end by a protective lens, and the vanes preferably being minutely deflected from the horizontal.

The desirability of preventing light from headlights from shining into the eyes of approaching drivers (and thereby creating a traffic hazard) has long been recognized. However, the devices heretofore proposed for this purpose have proven unsatisfactory and objectionable either because they too greatly interfered with road illumination or because they did not sufficiently reduce the glare to justify their use. The present invention overcomes both of these objections.

It is a principal object of this invention to provide a headlight attachment that very greatly reduces driver-blinding glare while producing a minimum of interference with illumination of the road.

A further object of the invention is to provide an anti-glare headlight attachment comprising a plurality of transversely curved vanes, in which said vanes are deflected from the horizontal.

A further object is to arrange such vanes so that an upper group of vanes are equally spaced and parallel and the remaining group of vanes are arranged with their base ends increasingly spaced apart and their opposite ends more greatly increasingly spaced apart in a substantially fan-like arrangement.

It is another object to produce a device of this type that is of simple, rugged and economical construction.

It is a further object to provide a headlight-glare eliminator that can easily be mounted under the fender and which is specially designed to prevent damage thereto by preventing engagement thereof with the underlying car wheel.

It is an overall object of this invention to generally improve the design, construction and efficiency of anti-glare devices.

The means by which the foregoing and other objects of this invention are accomplished and the manner of their accomplishment will be readily understood from the following specification upon reference to the accompanying drawings, in which:

Fig. 1 is an elevational view of the anti-glare attachment in a typical installation in the well of an automobile fender (partly broken away).

Fig. 2 is an enlarged top plan view of the anti-glare attachment of Fig. 1, with mounting means.

Fig. 3 is a rear end elevational view of the anti-glare attachment, per se.

Fig. 4 is an elevational view in longitudinal axial section taken on the line IV—IV of Fig. 3.

Fig. 5 is a transverse elevation in section taken on the line V—V of Fig. 4.

Fig. 6 is an enlarged fragmentary elevational detail view of the lower portion of Fig. 5.

Fig. 7 is a fragmentary rear end elevational view showing a suggested means and method for supporting the anti-glare attachment.

Fig. 8 is a perspective view of one of the vanes.

Fig. 9 is an enlarged fragmentary detail view in section of the upper right portion of Fig. 4.

Fig. 10 is an enlarged fragmentary detail view, partly in section, of the upper left portion of Fig. 4.

Referring now to the drawings in which the various parts are designated by numerals, the numeral 11 generally designates an automobile having, in addition to its other conventional parts, a front wheel 13 extending part way up in the wheel hood defined by the inner wall 15 and the fender proper 17.

The anti-glare attachment of this invention, generally designated 21, is adapted to be supported in the wheel hood above the front wheel 13 of the automobile with its front end set in a circular opening in the front face of fender 17 and with a conventional light source, such as a sealed-beam headlight 23 mounted at its rear end, in manner and by means to be hereinafter described.

The anti-glare device 21 comprises a conically tapered housing or shell 25 formed of stainless steel sheet or other suitable material and a plurality of reflector vanes, the reflector vanes being designated by the numeral 27, with certain of the vanes 27 being additionally identified by the addition of a letter suffix, as 27A, 27B, 27X, 27Y. Shell 25 does not need to be completely closed on its under side since the lowermost vane 27A of the reflector vanes 27 forms a bottom wall for the attachment, which wall is conveniently upwardly dished by its transverse curving to provide added clearance over the tread of the front wheel 13.

The reflector vanes 27 can also be made of sheets of stainless steel or aluminum, but preferably should be formed of thinner material than the shell 25 for economy in weight and cost. All of the vanes 27, including vanes 27A, 27B, 27X, 27Y, and the others, are transversely curved preferably arcuately, but are composed of straight-line elements longitudinally thereof. The vanes 27 are inwardly curved at their rear ends and are outwardly curved at their forward ends, the end curvatures being such as to produce conformity with the convex lens 23A of the headlight 23 and with the inner concave face of the transparent lens 29. To facilitate and improve the strength of the junction between reflector vanes 27 and shell 25, the vanes 27 are preferably provided with narrow attachment flanges 27B on their lateral edges (Figs. 6 and 8). Flanges 27B conveniently adapt the vanes for rigid attachment to shell 25 as by welding or otherwise and also greatly strengthen the vanes 27 and minimize bending before or during installation.

Each of the reflector vanes 27 is preferably formed with its lateral edges uniformly diverging from rear end to front end, so that the forward portions of the respective vanes are of a width substantially in excess of the vane width adjacent light source 23. When the vanes 27 are assembled into shell 25 to form the unit, the uppermost group of vanes, such as the group between and including vanes 27X and 27Y (Figs. 4 and 5), are arranged in substantial parallelism with the vertical spacings between the vanes of this upper group substantially equal. Preferably the vanes are spaced apart minor distances at their roots and when installed are preferably deflected from the horizontal so that the front end of each of these vanes is alined with the rear end of the next subjacent vane. The vanes of the lower group, as those between and including vanes 27A and 27B, are so arranged out of parallelism as to be fanned apart at their forward ends, this being accomplished by successively increasing the angles of declination from the horizontal and successively incrementally increasing the spacings between the root ends of the lower group of vanes. Thus the root or rear end of vane 27B is spaced from the root of vane 27Y a distance greater than the spacing between the root of vane 27Y and the root of the next superjacent vane, and the succeeding subjacent spacing is yet greater and so on, the maximum root spacing being achieved between vane 27A and the next superjacent vane. In addition the spacing of the outer or front ends of the lower group of vanes is thus more greatly increased than the spacing of the roots, so that for example the spacing between the outer ends of vanes 27Y, 27B is greater than the root spacing of those vanes and the successive spacings increase in order, the maximum front end spacing being achieved between the lowermost pair of vanes (vane 27A and the next superjacent vane) and being substantially in excess of the root spacing of that pair of vanes.

In order to maximize the desirable forwardly and downwardly directed light and to minimize the upwardly and laterally projected light, the lower faces of vanes 27 are provided, respectively, with highly light-reflective surfaces, while the upper faces of vanes 27 are provided, respectively with highly light-absorptive surfaces. The reflective surfaces can be formed by polishing or by silvering, enameling, etc. The light-absorbing surfaces can be produced by roughening, chemically treating, and/or coating with dark or black pigmented paints, etc. If the vanes are formed of aluminum, either or both surfaces can be conveniently produced by one of the now popular anodic-coating processes.

As shown in Fig. 7, the anti-glare attachment 21 can be rigidly attached to and supported from the wall 15 of the wheel hood by a metallic strap 31, bent to form a shell-embracing loop portion 31A. One end of strap 31 is bent to form flat tab 31B which is provided with a hole to receive bolt 33 for attaching the supporting strap 31 to the wheel-hood wall 15. The other end of stray 31 has a similar flat apertured tab 31C through which bolt 35 passes for tightening the loop portion 31A around the shell 25.

The front end of anti-glare attachment 21 is centered in an opening in, and is attached to, the front face portion of fender 17 by a dual-purpose trim-ring 41 (Fig. 9). Ring 41 is roughly T-shaped in transverse cross section, the stem of the T being formed by a short cylindrical annulus 41A adapted to embrace the front end of the shell 25, to which it may be firmly attached as by one or more screws 43. Trim ring 41 also has an inwardly directed flange 41B serving to retain lens 29 in position to cover the front ends of vanes 27 and the open end of shell 25. The outwardly directed flange 41C overlies the fender portion surrounding the opening for the anti-glare attachment 21. Flange 41C is provided with circumferentially spaced apertures to receive screws 45 for firmly fastening the ring 41, and the attachment 21 supported thereby, to the fender 17.

The sealed-beam headlight 23 may be conveniently attached to the rear end of housing 25 by a metallic band 47 (Fig. 10) rearwardly constricted at 47A to embrace the rounded periphery of the rear surface of headlight 23, as shown. Forwardly, the band 47 embraces the rear edge of shell 25 to which it is rigidly attached by screws 49. Headlight 23 has conventional terminals 23B for mating engagement with an electrical socket 51, which is in turn connected to a source of electric energy by a cable 53.

Thus it is seen that I have provided a simple, economical, easily installed, and highly effective safety attachment for automobiles, which substantially completely eliminates driver-blinding glare without appreciably interfering with the desired forwardly and downwardly directed road-illuminating rays. It will be seen that the anti-glare headlight is greatly elongated relative to its maximum diameter, the length of the unit being of the nature of three times the diameter of the forward end, and being such that, when installed on automobile 11, the light source 23 is positioned substantially rearwardly of the wheel center of wheel 13. The unit thus overlies the wheel substantially throughout the entire wheel diameter and projects forwardly therebeyond to extend into the opening formed in the front fender wall forwardly of the wheel periphery.

I claim:

1. In an automotive vehicle having a forwardly directed substantially circular light source, an anti-glare attachment mounted in combination with said light source for deflecting light rays away from objects approaching the front of said vehicle, said attachment including a transparent lens substantially greater in area than the forward portion of said light source and spaced forwardly of said light source, said lens having an arcuate periphery, a truncate, substantially conical housing extending between and rigidly fixed to said light source and said lens with the exterior surface of said housing light-tightly fitting the peripheries of said light source and said lens, the uppermost portion of said housing being horizontal, and a plurality of longitudinally extending, transversely arched, non-translucent, reflective vanes encased within said housing and extending substantially from said light source to said lens, said plurality of vanes including an upper group of vanes and a lower group of vanes, each said vane being extended forwardly from said light source and downwardly deflected at an angle of declination from the horizontal, the uppermost of said upper group of vanes merging with said housing adjacent but forwardly of said light source and engaging said lens adjacent the upper extremity of said lens, said upper group of vanes being deflected from the horizontal in parallelism to said uppermost vane, said upper group of vanes being equally vertically spaced apart, the vertical spacing between the respective vanes of said upper group of vanes being of a minor distance relative to the length of the vanes of said group, the respective forward ends of said vanes of the upper group being deflected below the horizontal level of the respective rear ends a distance substantially equal to said minor distance of spacing, to position the forward end of each superjacent vane in horizontal alinement with the rear end of the next subjacent vane, the vanes of said lower group being disposed at angles of declination from the horizontal greater than the common angle of declination of the vanes of said upper group, the rear end of the upper vane of said lower group being vertically spaced from the rear end of the lower vane of said upper group a distance substantially equal to the vertical spacing between the vanes of said upper group, said upper vane of said lower group, being at an angle slightly greater than said common angle and each succeeding subjacent vane of said lower group being respectively disposed at a greater angle of declination than the angle of declination of the next superjacent vane, the forward ends of the vanes of said lower group being each respectively vertically spaced from the next superjacent vane a distance in excess of the vertical spacing between the vanes of said upper group, each vane of said lower group being spaced a greater distance from its next subjacent vane than from its next superjacent vane, and the respective vertical spacings between each vane of said lower group from its next subjacent vane being of a length relative to the angle of vane declination to position the forward ends of said vanes of the lower group respectively substantially in horizontal alinement with rearward portions of the respective subjacent vanes; whereby to block the passage of horizontal and upwardly inclined light beams from said light source to said lens.

2. In an automotive vehicle having a forwardly directed substantially circular light source, an anti-glare attachment mounted in combination with said light source for deflecting light rays away from objects approaching the front of said vehicle, said attachment including a transparent lens substantially greater in area than the forward portion of said light source and spaced forwardly of said light source, said lens having an arcuate periphery, a truncate, substantially conical housing extending between and rigidly fixed to said light source and said lens with the exterior surface of said housing light-tightly fitting the peripheries of said light source and said lens, the uppermost portion of said housing being horizontal, and a plurality of longitudinally extending, transversely arched, non-translucent reflective vanes encased within said housing and extending substantially from said light source to said lens, said plurality of vanes including an upper group of vanes and a lower group of vanes, each said vane being extended forwardly from said light source and downwardly deflected at an angle of declination from the horizontal, the uppermost of said upper group of vanes merging with said housing adjacent but forwardly of said light source and engaging said lens adjacent the upper extremity of said lens, said upper group of vanes being equally vertically spaced apart, the vanes of said lower group being disposed at angles of declination from the horizontal greater than the angle of declination of said vanes of said upper group, the forward ends of the vanes of said lower group being each respectively vertically spaced from the next superjacent vane a distance in excess of the vertical spacing between the vanes of said upper group; whereby to block the passage of horizontal and upwardly inclined light beams from said light source to said lens.

3. An anti-glare attachment adapted for use with a light source of an automotive vehicle for deflecting light rays away from objects approaching the front of a said vehicle, said attachment including a transparent lens at the forward end of said attachment, said lens having an arcuate periphery, a truncate, substantially conical light-tight housing extending rearwardly from and rigidly fixed to said lens with the exterior surface of said housing light-tightly fitting the periphery of said lens, said housing being adapted to light-tightly fit the light source at its rear end, the uppermost portion of said housing being horizontal, and a plurality of longitudinally extending, transversely arched, non-translucent reflective vanes encased with said housing and extending substantially from said rear end to said lens, said plurality of vanes including an upper group of vanes and a lower group of vanes, each said vane being extended forwardly from said rear end and downwardly deflected at an angle of declination from the horizontal, the uppermost of said upper group of vanes merging with said housing adjacent said rear end and engaging said lens adjacent the upper extremity of said lens, said upper group of vanes being equally vertically spaced apart, the vanes of said lower group being disposed at angles of declination from the horizontal greater than the angle of declination of said vanes of said upper group, the forward ends of the vanes of said lower group being each respectively vertically spaced from the next superjacent vane a distance in excess of the vertical spacing between the vanes of said upper group; whereby to block the passage of horizontal and upwardly inclined light beams from said rear end to said lens.

4. An anti-glare attachment adapted for use with a light source of an automotive vehicle for deflecting light rays away from objects approaching the front of a said vehicle, said attachment including a transparent lens at the forward end of said attachment, a light-tight housing extending rearwardly from and rigidly fixed to said lens with the exterior surface of said housing light-tightly fitting the periphery of said lens, said housing being adapted to light-tightly fit the light source at its rear end, and a plurality of longitudinally extending, non-translucent reflective vanes encased with said housing and extending substantially from said rear end to said lens, said plurality of vanes including an upper group of vanes and a lower group of vanes, each said vane being extended forwardly from said rear end and downwardly deflected at an angle of declination from the horizontal, the uppermost of said upper group of vanes merging with said housing adjacent said rear end and engaging said lens adjacent the upper extremity of said lens, said upper group of vanes being equally vertically spaced apart, the vanes of said lower group being disposed at angles of declination from the horizontal greater than the angle of declination of said vanes of said upper group, the forward ends of the vanes of said lower group being each respectively vertically spaced from the next superjacent vane a distance in excess of the vertical spacing between the vanes of said upper group; whereby to block the passage of horizontal and upwardly inclined light beams from said rear end to said lens.

References Cited in the file of this patent

UNITED STATES PATENTS

| | | |
|---|---|---|
| 1,637,608 | Ehrlichman | Aug. 2, 1927 |
| 1,737,995 | Cooke | Dec. 3, 1929 |
| 2,006,125 | Barber | June 25, 1935 |
| 2,415,120 | Whiting | Feb. 4, 1947 |
| 2,568,782 | Whiting | Sept. 25, 1951 |

FOREIGN PATENTS

| | | |
|---|---|---|
| 155,617 | Great Britain | Dec. 30, 1920 |
| 752,105 | France | Sept. 19, 1933 |
| 511,501 | Great Britain | Aug. 21, 1939 |
| 412,439 | Italy | Dec. 18, 1945 |